(12) United States Patent
Ungerboeck et al.

(10) Patent No.: US 8,437,366 B2
(45) Date of Patent: *May 7, 2013

(54) METHOD AND SYSTEM FOR 10GBASE-T START-UP

(75) Inventors: Gottfried Ungerboeck, Langnau a.A (CH); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/099,760

(22) Filed: May 3, 2011

(65) Prior Publication Data

US 2011/0205934 A1 Aug. 25, 2011

Related U.S. Application Data

(63) Continuation of application No. 11/410,172, filed on Apr. 24, 2006, now Pat. No. 7,936,778.

(60) Provisional application No. 60/722,677, filed on Sep. 30, 2005.

(51) Int. Cl.
*H04J 3/00* (2006.01)
*H04L 12/26* (2006.01)

(52) U.S. Cl.
USPC .......................................... 370/464; 370/241

(58) Field of Classification Search .................... 370/464
See application file for complete search history.

(56) References Cited

U.S. PATENT DOCUMENTS

2005/0165959 A1* 7/2005 Huff .............................. 709/238

* cited by examiner

*Primary Examiner* — Mark Rinehart
*Assistant Examiner* — Angel Brockman
(74) *Attorney, Agent, or Firm* — Thomas | Horstemeyer, LLP

(57) ABSTRACT

Certain aspects for the start-up procedure of transceivers supporting higher data rates over twisted-pair copper cabling are provided for 10 Gbit/sec Ethernet links (10GBASE-T). During a PMA (physical medium attachment) training period of the start-up procedure, long PMA training frames are exchanged periodically between link partners. A significant portion of each PMA training frame consists of known pseudo random sequences simultaneously transmitted over four wire pairs. PMA training frames include an InfoField for exchanging parameters and control information between link partners. For example, the InfoField's payload comprises fields for indicating current transmit power backoff (PBO), next PBO, requested PBO, transition count, control information, and for communicating precoder coefficients. Information in InfoFields is repeated and is not necessary that a link partner decodes every InfoField. For example, by occasionally reading the transition count, a link partner can determine when a change in transmit PBO and/or a state transition is to occur.

20 Claims, 6 Drawing Sheets

METHOD AND SYSTEM FOR 10GBASE-T START-UP

CROSS-REFERENCE TO RELATED APPLICATIONS/INCORPORATION BY REFERENCE

This patent application is a continuation of U.S. patent application Ser. No. 11/410,172 filed on Apr. 24, 2006, which application makes reference to, claims priority to, and claims benefit from U.S. Provisional Patent Application Ser. No. 60/722,677 filed on Sep. 30, 2005.

The above referenced application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to networking. More specifically, certain embodiments of the invention relate to a method and system for training 10 Gbit/sec Ethernet transceivers for twisted-pair cabling (10GBASE-T) during a start-up procedure.

BACKGROUND OF THE INVENTION

As the number of devices connected to data networks increase and higher data rates are required, there is a growing need for new transmission technologies enabling higher transmission rates over existing copper cabling infrastructures. A current effort to that end is the development of a standard for 10 Gbit/sec Ethernet transmission over twisted-pair cabling (10GBASE-T). The emerging 10GBASE-T physical layer (PHY) specification is intended to enable 10 Gbit/sec connections over twisted-pair cabling at distances of up to 182 feet for existing cabling, and at distances of up to 330 feet for new cabling, for example. To achieve full-duplex transmission at 10 Gbit/sec over four-pair cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. Moreover, new cabling specifications are developed to diminish susceptibility to external electromagnetic interferences.

A pair of 10GBASE-T PHY transceivers on each side of a link must initially be trained during a start-up procedure to adapt transmitter and receiver settings to the specific characteristics of the link. The start-up procedure may include establishing initial synchronization, setting transmit power levels, adjusting echo and near-end crosstalk cancellers, adjusting equalizers, selecting and exchanging precoding coefficients, etc. Elaborate start-up procedures are known in the art, for example those used in voiceband modems. Some start-up procedures are aimed at achieving relatively short start-up times. For lower-rate PHY transceivers prior to 10GBASE-T, real-time execution of start-up specific functions meeting the requirements of time-critical handshake procedures usually did not pose severe problems. For 10GBASE-T, where start-up time may not be a critical issue, minimizing the means required for accomplishing start-up specific functions may be more important. Hence there is a need for a start-up procedure that permits performing such functions by shared hardware, firmware, or software at far less than real-time speed in exchange for a longer start-up time. Then only functions needed for sustained continuous data transmission, such as long digital filters or decoders for error correction decoding, must be realized by highly efficient hardware that can perform these functions in real time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for 10 Gbit/sec Ethernet over twisted-pair cabling (10GBASE-T) start-up, substantially as shown and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
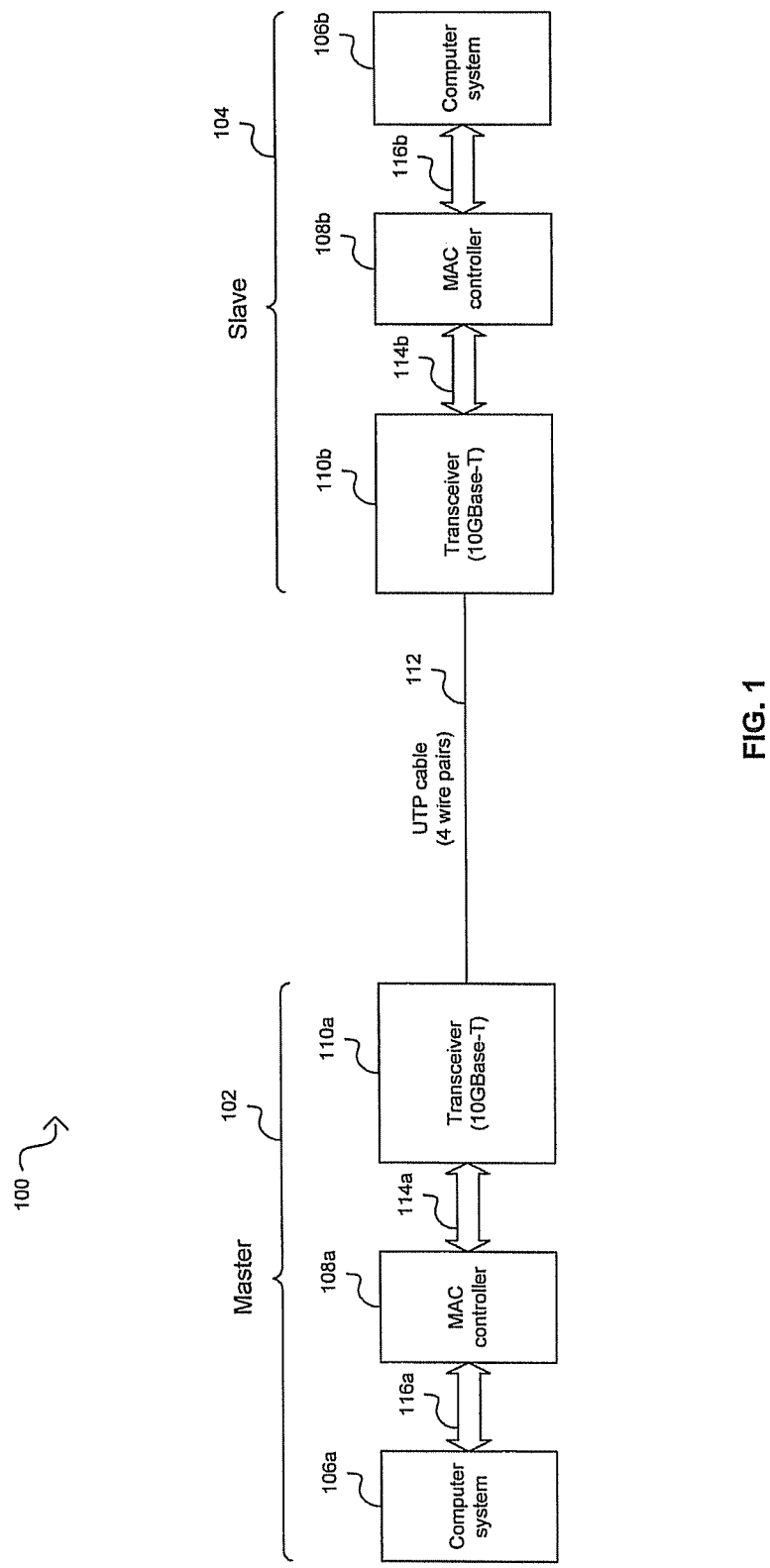
FIG. 1 shows a block diagram of a 10 Gbit/sec Ethernet over twisted-pair cabling (10GBASE-T) link between a master link partner and a slave link partner, in accordance with an embodiment of the invention.

Certain embodiments of the invention may be found in the start-up procedure of the emerging physical layer specification 10BASE-T, which is intended to become part of the IEEE 802.3 Ethernet standard. 10GBASE-T transceivers will enable 10 Gbit/sec transmission over twisted-pair copper cables. The specification provides for full-duplex transmission simultaneously over four pairs of ISO Class E or Class F cables at a rate of 2.5 Gbit/sec per pair.

During IEEE 802.3 Auto Negotiation, the link partners agree on the type of physical layer transmission to be used. Also, one transceiver assumes the role of a Master and the other the role of a Slave. If 10GBASE-T has been selected, the link partners then proceed to the 10GBASE-T start-up procedure.

The 10GBASE-T start-up procedure is characterized by the following features. During an initial PMA (Physical Medium Attachment) training period, long PMA training frames are periodically transmitted over all four pairs. The length of the PMA training frames may be 16 k symbol times, for example. Each PMA training frame consists of a known pseudo random sequence of binary modulation symbols. In addition, the frames transmitted over one of the four pairs in each direction comprise an InfoField, which is short compared to the length of the PMA training frames. The InfoFields are used for exchanging parameters and control information between the link partners. Transmission is started by the Master transceiver on all four pairs. After detecting the Master signals and receiving an invitation to start transmission, the Slave transceiver also starts to transmit on all four pairs.

Knowledge of the periodically transmitted binary sequences enables the receiver sections of the link partners to acquire and maintain symbol timing and PMA frame synchronization throughout the entire PMA training period. For other purposes the known long sequences exhibit the characteristics of essentially random sequences.

The InfoFields convey control information of various types. For example, the InfoField's payload comprises fields for indicating current transmit PBO (power backoff) of the transmitting transceiver, next transmit PBO of the transmitting transceiver, requested PBO for the transceiver of the link partner, and a transition count. The InfoField's payload contains also fields for sending precoder coefficients, indicating the SNR margin in the receiver section of a transceiver, and other control information. The transition count indicates the remaining number of PMA training frames, after which an announced change will occur. The change may be a change in transmit PBO and/or or a transition to a next state in the state diagram of the transmitting transceiver. A link partner is not required to decode every received InfoField, and is never required to react immediately to information received in InfoFields. For example, by only occasionally decoding an InfoField and reading the transition count therein, a link partner can determine when the announced change is to occur. Thus resources needed for performing a variety of start-up specific functions can be allocated in transceivers with great flexibility and without stringent real-time requirements.

FIG. 1 shows a block diagram of a 10 Gbit/sec Ethernet over twisted-pair cabling (10GBASE-T) link between a master link partner and a slave link partner, in accordance with an embodiment of the invention. Referring to FIG. 1, there is shown a system 100 that comprises a master link partner 102 and a slave link partner 104. The master link partner 102 and the slave link partner 104 communicate via a 4-wire unshielded twisted pair (UTP) cable 112. The master link partner 102 comprises a computer system 106a, a medium access control (MAC) controller 108a, and a transceiver 104a. The slave link partner 104 comprises a computer system 106b, a MAC controller 108b, and a transceiver 110b. Notwithstanding, the invention is not limited in this regard.

The transceiver 110a comprises suitable logic, circuitry, and/or program code that enables communication, for example, transmission and reception of data, between the master link partner 102 and a link partner, such as the slave link partner 104, for example. Similarly, the transceiver 110b comprises suitable logic, circuitry, and/or code that may enable communication between the slave link partner 104 and a link partner, such as the master link partner 102, for example. The transceivers 110a and 110b enable 10GBASE-T operations. The data transmitted and/or received by the transceivers 110a and 110b is formatted in accordance with the well-known IEEE 802 LAN/MAN standards.

Figure 2:
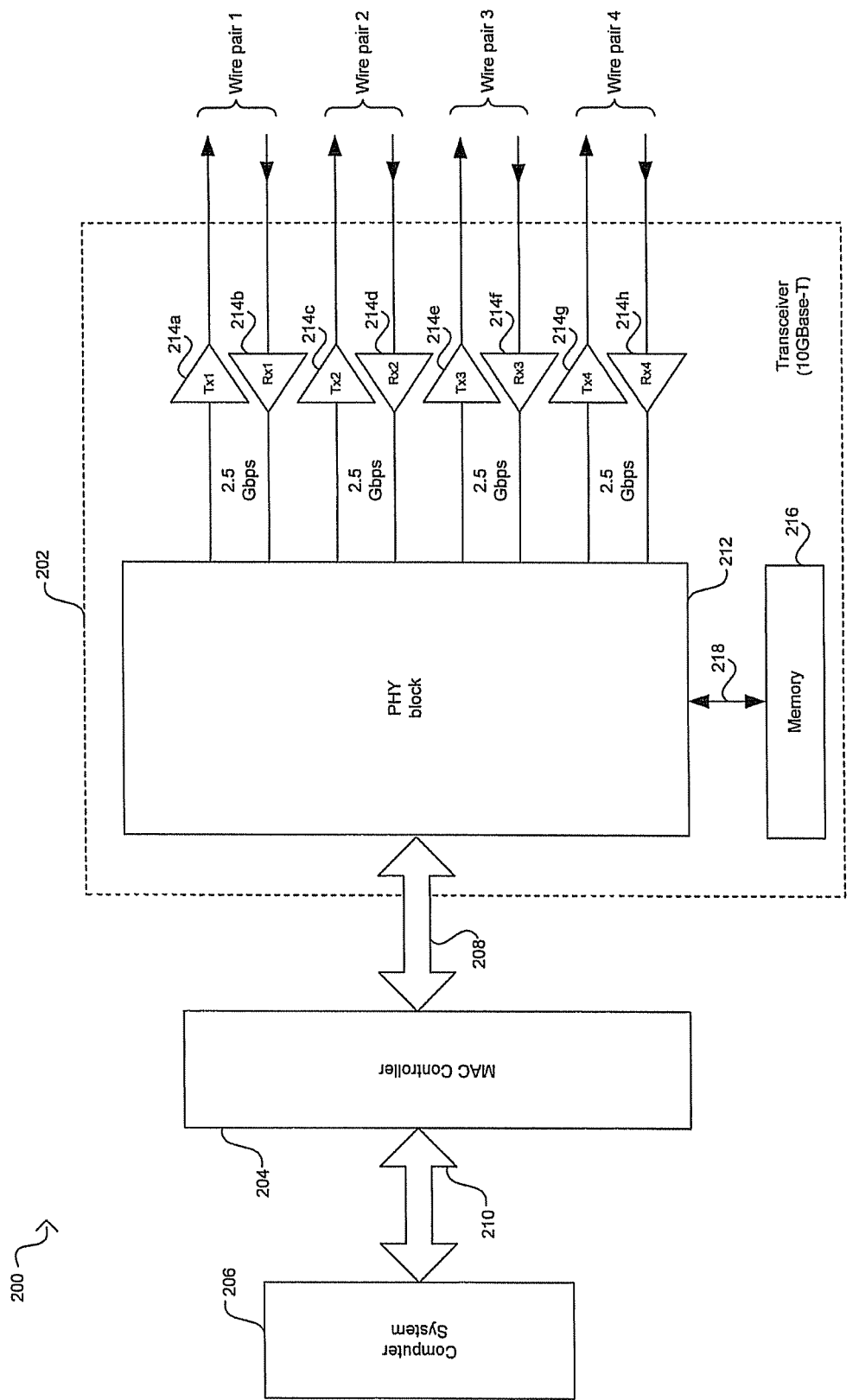
FIG. 2 shows a block diagram of an exemplary 10GBASE-T link partner, in accordance with an embodiment of the invention.

FIG. 2 shows a block diagram of an exemplary 10GBASE-T link partner, in accordance with an embodiment of the invention. Referring to FIG. 2, there is shown a link partner 200 that comprises a transceiver 202, a MAC controller 204, a computer system 206, an interface 208, and a bus controller interface 210. The transceiver 202 can be an integrated device that comprises a PHY block 212, a plurality of transmitters 214a, 214c, 214e, and 214g, a plurality of receivers 214b, 214d, 214f, and 214h, a memory 216, and a memory interface 218. The transceiver 202 is the same as or substantially similar to the transceivers 110a and 110b described in FIG. 1. Similarly, the MAC controller 204, the computer system 206, the interface 208, and the bus controller 210 are the same as or substantially similar to the respective MAC controllers 108a and 108b, computer systems 106a and 106b, interfaces 114a and 114b, and bus controller interfaces 116a and 116b described in FIG. 1.

The PHY block 212 in the transceiver 202 comprises suitable logic, circuitry, and/or program code that enables operability and/or functionality of PHY layer requirements. The PHY block 212 communicates with the MAC controller 204 via the interface 208. In one aspect of the invention, the interface 208 may be configured to utilize a plurality of serial data lanes for receiving data from the PHY block 212 and/or for transmitting data to the PHY block 212, in order to achieve compatible 10 Gb/sec operational speeds. The PHY block 212 is configured to operate in one or more of a plurality of communication modes, where each communication mode implements a different communication protocol.

The transmitters 214a, 214c, 214e, and 214g comprises suitable logic, circuitry, and/or program code that enables transmission of data from the link partner 200 to a link partner via the UTP cable 212 in FIG. 1, for example. The receivers 214b, 214d, 214f, and 214h comprise suitable logic, circuitry, and/or program code that may enable receiving data from a link partner by the link partner 200. Each of the four pairs of transmitters and receivers in the transceiver 202 correspond to one of the four wires in the UTP cable 212. For example, transceiver 214a and receiver 214b are utilized to communicate with a link partner via the first wire pair in the UTP cable 212. Similarly, transceiver 214g and receiver 214h are utilized to communicate with a link partner via the fourth wire pair in the UTP cable 212. In this regard, each of the four transceiver/receiver pairs correspond to a 2.5 Gbit/sec connection, for example.

Figure 3:
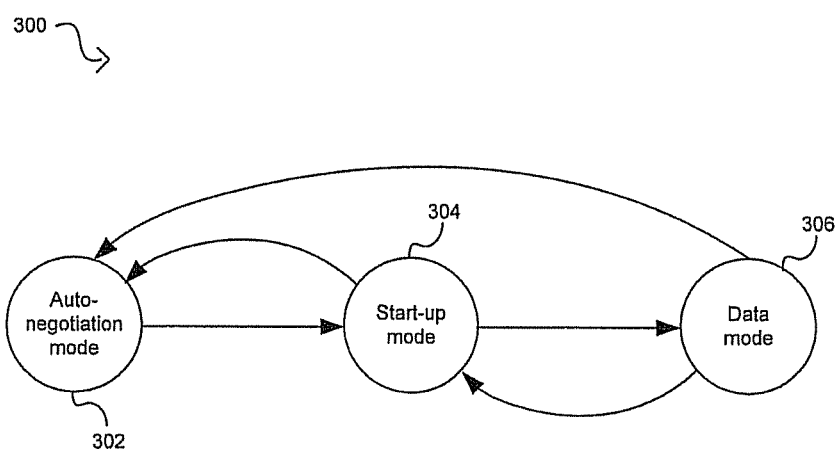
FIG. 3 is a state diagram illustrating modes of operation in a 10GBASE-T link partner, in accordance with an embodiment of the invention.

FIG. 3 is a state diagram illustrating modes of operation in a 10GBASE-T link partner, in accordance with an embodiment of the invention. Referring to FIG. 3, there is shown a state diagram 300 that comprises an auto-negotiation mode 302, a start-up mode 304, and a data mode 306. The PHY block 212 in the transceiver 202 described in FIG. 2 are utilized by a link partner to coordinate state or mode transitions when establishing a network connection with a link partner. During the auto-negotiation mode 302, a master link partner and a slave link partner determines the maximum connection speed that may be supported for communicating with each other.

When the auto-negotiation mode 302 is completed and 10GBASE-T has been selected as a physical layer transmission method, the link partners transition to the 10GBASE-T start-up mode 304 where appropriate training signals and/or control information are exchanged in order to establish the 10 Gbit/sec network connection. In some instances, during the start-up mode 304, certain conditions can arise that require the link partners to transition back to the auto-negotiation mode 302 and determine a new maximum connection speed.

When a network or link connection is properly established in the start-up mode 304, the link partners will transition to the data mode 306 where they communicate information. Upon termination of the network connection, the link partners transition back to the auto-negotiation mode 302. In some instances, during the data mode 306, certain conditions can arise that require the link partners to transition to the start-up mode 304 and reestablish the network connection.

Figure 4:
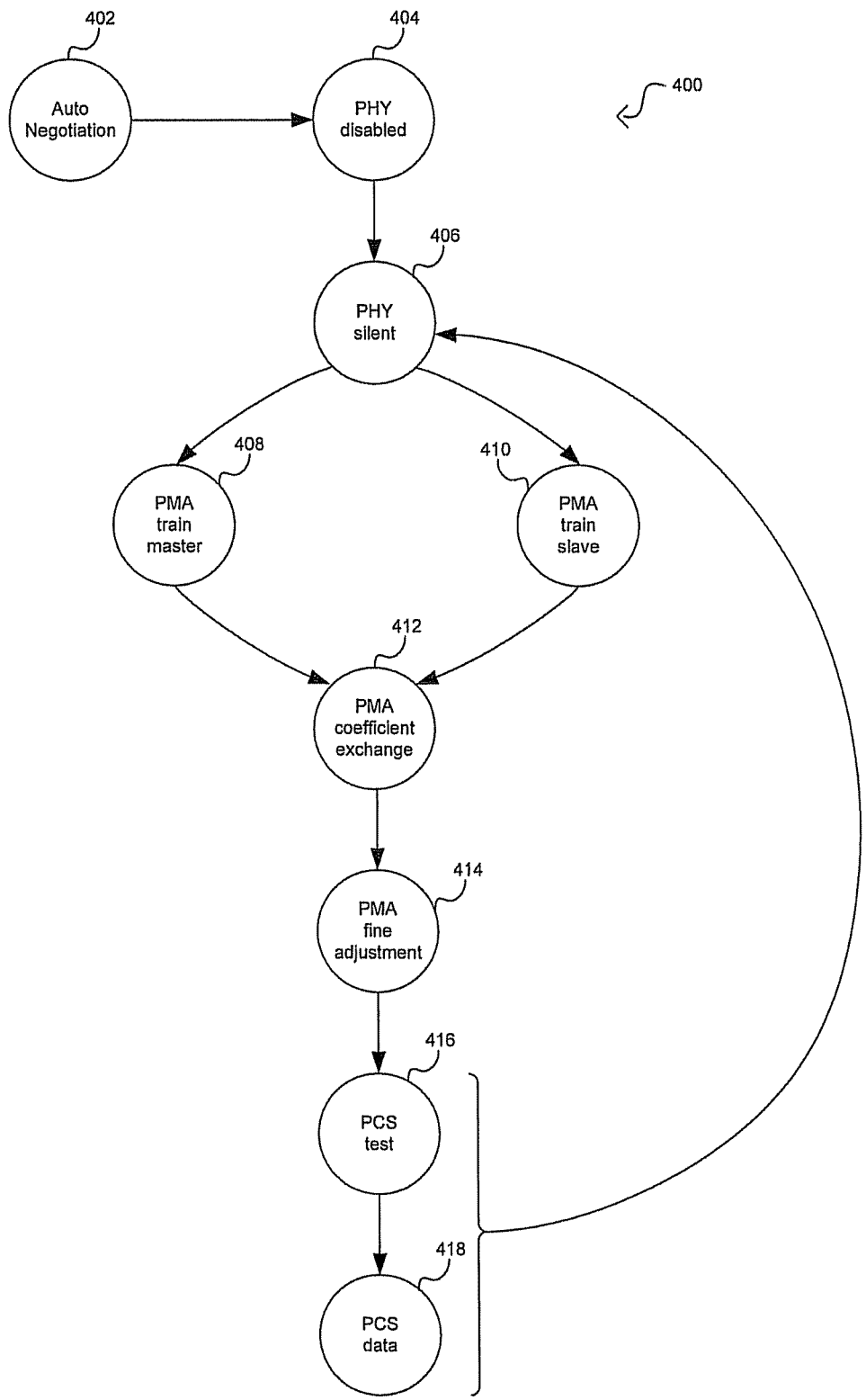
FIG. 4 is a state diagram illustrating a start-up sequence that includes a physical medium attachment (PMA) training period, in accordance with an embodiment of the invention.

FIG. 4 is a state diagram illustrating a start-up sequence that includes a PMA training period, in accordance with an embodiment of the invention. Referring to FIG. 4, there is shown a state diagram 400 that corresponds to changes in states of operation of the PHY block 212 when a network connection is established. When the auto-negotiation state 402 is completed, a signal is generated to enable the PHY block 212 to transition from a PHY disabled state 404 to a PHY silent state 406. During the PHY silent state 406, the PHY block 212 remains silent, that is, the PHY block 212 does not communicate with the link partner. After the appropriate silence interval is completed, the operation of the PHY block 212 transitions to a PMA train master state 408, if the link partner is configured as a master link partner. Alternatively, the operation of the PHY block 212 transitions to a PMA train slave state 410, if the link partner is configured as a slave link partner.

During the PMA train master state 408, the master link partner starts sending PMA training frames to the slave link partner. When the master link partner is ready to receive PMA training frames from the slave link partner, it invites the slave link partner to transmit its own PMA training frames and waits for the slave link partner's PMA training frames.

The PMA training frames may be long, repetitive or periodic frames that comprise a pseudo random portion or sequence and an information field or InfoField, for example. The pseudo random portion may be generated from seed values determined during the auto-negotiation state 402. The PMA training frames may be 16 k symbols in length and have a duration of approximately 20.48 µs, for example. The PMA training frames are modulated using 2-level pulse amplitude modulation (2-PAM), for example. The InfoField portion of the PMA training frames comprises information that enables the Master and Slave link partners to train echo and/or near-end crosstalk cancellers, to train receivers, and to establish appropriate transmitter power levels, for example. The contents of the pseudo random portion of PMA training frames shall be known while the contents of the InfoFields vary in accordance with progress in the start-up procedure. Processing of information in response of to received InfoFields need not be performed in real time.

During the PMA train slave state 410, the slave link partner conditions its receiver section to receive PMA training frames and the InfoFields therein contained from the master link partner. When this is accomplished and an invitation from the master link partner to start transmission is received, the slave link partner starts transmission of PMA training frames.

While operating in the PMA master or slave states, the link partners ensure that satisfactory transceiver operation with enough signal-to-noise ratio (SNR) margin is achieved for reliably decoding after completion of the PMA training period physical coding sublayer (PCS) frames. This includes requesting through the requested transmit PBO field of InfoFields sent to the link partner that the link partner switches its transmit PBO setting to the requested value. By using the transition count field in the InfoFields, the link partners announce to each other when the change of their respective PBO settings will actually occur.

After completion of either the PMA train master state 408 or the PMA train slave state 410, the PHY block 212 proceeds to the PMA coefficient exchange state 412. During the PMA coefficient exchange state 412, the link partners send and receive precoding coefficients via InfoFields. In this regard, the operations of the master and slave link partners are symmetrical. For example, 64 decision feedback filter coefficients, 16 coefficients for each of the four wire pairs in the UTP cable, may be communicated to the link partner for later use for precoding, such as Tomlinson-Harashima (TH) precoding, by the link partner during the PMA fine adjustment state 414 and onwards. After the exchange of coefficients is completed, the link partners announce by using the transition count in the InfoFields to each other a transition from PMA coefficient exchange state 412 to the PMA fine adjustment state 414.

During the PMA fine adjustment state 414 the coefficients received from the link partner are employed for sending additional PMA training frames now with TH precoding. After the link partners have to completed and refined adjustments necessary to establish the final link connection. In this regard, the PMA fine adjustment state 414 ensures proper reception of TH precoded PMA training frames on both sides of the link and final convergence of all adaptive filters. When this is accomplished, the link partners announce by using the transition count in the InfoFields to each other a transition from PMA fine adjust state 414 to the PCS test state 416. The completion of the PMA fine adjustment state 414 also corresponds to the completion of the PMA training period.

During the PCS test state 416, the master and slave link partners operations are symmetric. Instead of PMA training frames the link partners send PCS frames using the final coding and modulation for sending data at 10 Gbit/sec bi-directionally over the link. For example, the PCS frames may be low-density parity-check (LDPC) coded with a mapping of bits to higher-order modulation symbols from a two-dimensional 128-point Double Square (128-DSQ) constellation, and the frames may be 320 ns in duration. In the PCS test state 416, only scrambled test data are transmitted, which can be distinguished from user data. Each link partner monitors its receiver performance. If after the determined time period satisfactory receiver performance is asserted, a link partner proceeds to the PCS data state 418. In this state, the link partners send user data from the transmit portion of the MAC interface and deliver user data to the receive portion of the MAC interface. If in the PCS test state 416 or in the PCS data state 418 a link partner detects an error situation, which may consists in too frequent decoding failures, it transitions back to the PHY silent state 406. As a result, the other link partner will also detect an error situation and transition back to the PHY silent state 406.

Figure 5:
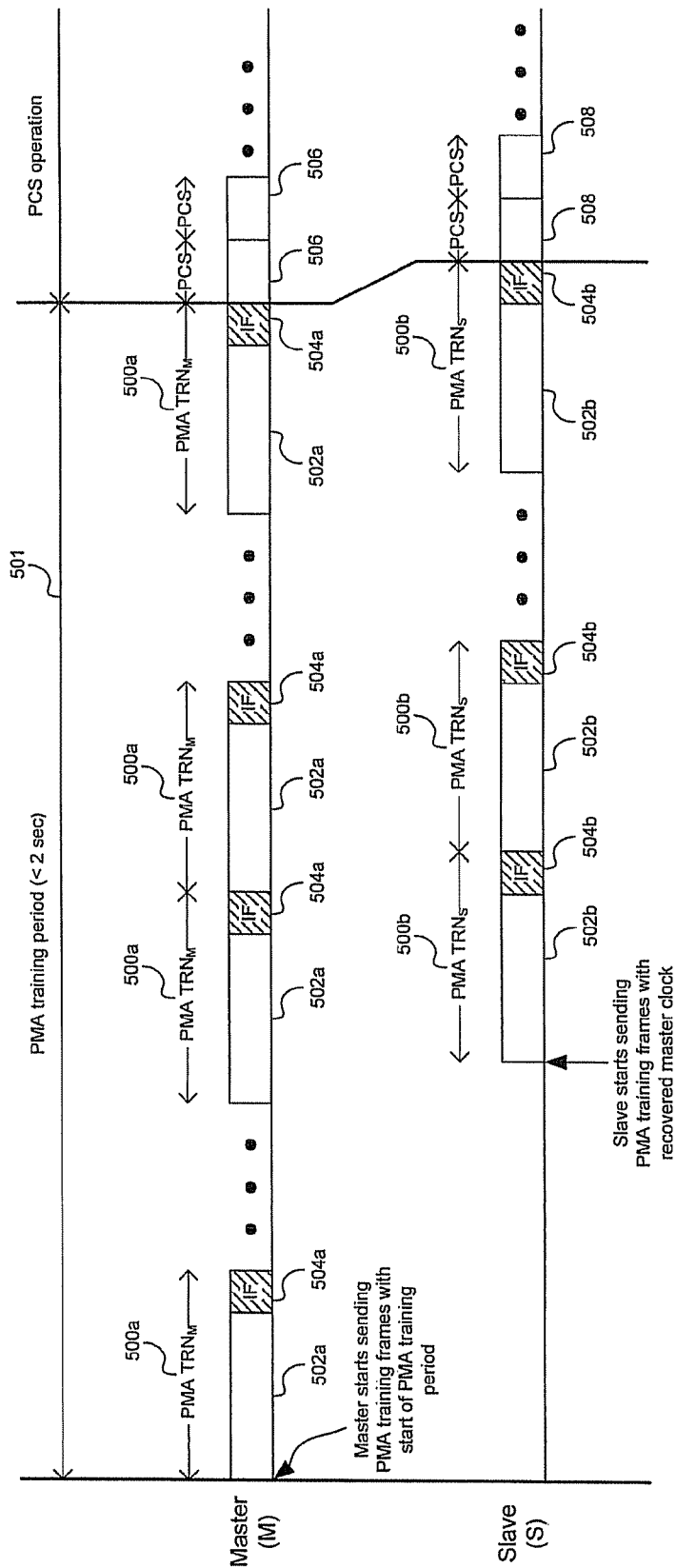
FIG. 5 depicts an exemplary exchange of PMA training frames between master and slave link partners, in accordance with an embodiment of the invention.

FIG. 5 depicts an exemplary exchange of PMA training frames between master and slave link partners, in accordance with an embodiment of the invention. Referring to FIG. 5, there is shown a PMA training period 501 that may be up to 2 sec in duration, for example. During the PMA training period 501, the master (M) and slave (S) link partners exchange PMA training frames. Regarding the master link partner, there is shown a sequence of master PMA training (PMA TRN$_M$) frames 500a transmitted to the slave link partner. Each PMA TRN$_M$ frame 500a comprises a pseudo random portion 502a and an InfoField (IF) 504a. The start of the first PMA TRN$_M$ frame 500a corresponds to the start of the PMA training period 501. The end of the last PMA TRN$_M$ frame 500a corresponds to the end of the PMA training period 501 for the master link partner. After the end of the PMA training period 501, the master link partner begins PCS operation and transmits PCS frames 506 to the slave link partner during PCS operations in accordance with the state diagram given in FIG. 4.

Similarly, FIG. 5 shows a sequence of slave PMA training (PMA $TRN_s$) frames 500b transmitted to the master link partner. Each PMA $TRN_S$ frame 500b comprises a pseudo random portion 502b and an IF 504b. The start of the first PMA $TRN_S$ frame 500b occurs after the master clock is recovered from the received PMA $TRN_M$ frames 500a. The end of the last PMA $TRN_S$ frame 500b corresponds to the end of the PMA training period 501 for the slave link partner. After the end of the PMA training period 501, the slave begins PCS operation and transmits PCS frames 508 to the master link partner in accordance with the state diagram given in FIG. 4.

Figure 6:
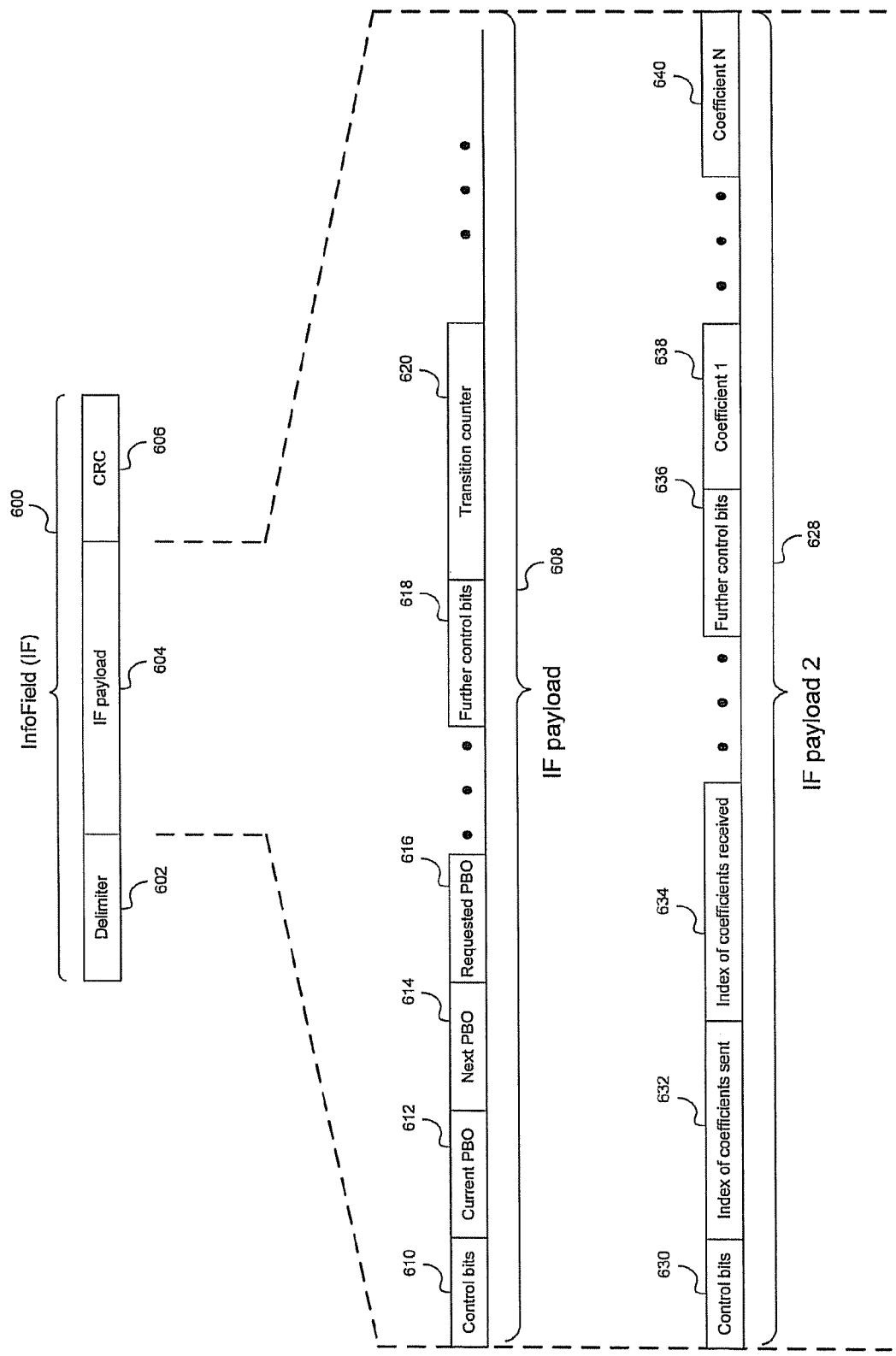
FIG. 6 illustrates exemplary InfoField payloads, in accordance with an embodiment of the invention.

FIG. 6 illustrates exemplary InfoField payloads, in accordance with an embodiment of the invention. Referring to FIG. 6, there is shown an InfoField (IF) 600 that comprises a delimiter 602, an IF payload 604, and a cyclic redundancy check (CRC) 606. The delimiter 602 comprises a known binary sequence. In some instances, the IF 600 may be implemented without a delimiter 602. The CRC 606 comprises information for verifying the contents of the IF payload 604, for example.

The IF payload 604 comprises a plurality of fields that may contain information that may be utilized by the master and slave link partners during the PMA training period of the start-up procedure. In this regard, there may be various configurations of fields in the IF payload 604 based on the current state in the start-up procedure. For example, there is shown in FIG. 6 an IF payload 608 that comprises fields such as control bits 610, current power backoff (PBO) 612, next PBO 614, requested PBO 616, further control bits 618, and transition counter 620. The control bits 610 and the further control bits 618 may be utilized to indicate the current state in the start-up procedure and the local receiver's status for reliable decoding. The current PBO 612 field may be utilized to indicate the current power backoff of the transmitting link partner from a nominal maximum transmit power level. The next PBO 614 field in combination with the transition count may be utilized to announce to the link partner a change in the transmit PBO to the value in the next PBO field. The requested PBO 616 field may be utilized to request that the remote link partner sets the transmit PBO to a requested value.

The transition counter 620 field may be utilized to announce to the remote link partner a transition in the characteristics of the signal of the transmitting link partner. The transition counter 620 field may be set to a value that indicates the number of PMA frames after which the transition will occur. The value in this field is decremented with each subsequent transmission of an InfoField 600 until the value zero is reached. In this regard, the link partner need not decode the InfoField of every PMA training frame. It suffices to read the InfoField only occasionally to obtain the current value of the transition count and thus know when an announced change is to occur.

Also shown in FIG. 6 is an IF payload 628 that comprises fields such as control bits 630, index of coefficients sent 632, index of coefficients received 634, further control bits 636, and a group of N coefficient fields containing coefficient 1 638 to coefficient N 640. The control bits 630 and the further control bits 636 may indicate the current state in the start-up procedure and the local receiver's status for reliable decoding. The index of coefficients sent 632 field may indicate the group of N coefficients currently being transmitted to the link partner in fields coefficient 1 638 to coefficient N 640. The index of coefficients received 634 field may acknowledge to the link partner up to which group of N coefficients the transmitting link partner has already correctly received coefficients. In this regard, for example, when the local link partner has received all coefficients from the remote link partner and the remote link partner acknowledges reception of all coefficients, the bidirectional coefficient exchange is complete. The link partners may then announce a transition to the PMA fine adjustment state 414.

The approach described herein permits realizations of start-up specific function with great flexibility in non-real time.

Accordingly, the present invention may be realized in hardware, software, or a combination of hardware and software. The present invention may be realized in a centralized fashion in at least one programmable computing system, or in a distributed fashion where different elements are spread across several interconnected computing elements. Any kind of computing system or other apparatus adapted for carrying out the methods described herein is suited. A typical combination of hardware and software may be a general-purpose computer system with a program for processing captured data and signal traces, and thus carrying out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for setting up communication devices, the method comprising:
    transmitting, from a device, physical medium attachment (PMA) training frames to a remote device during a training period, wherein:
        a majority portion of each of the transmitted PMA training frames is comprised of pseudo random known sequences that are utilized to establish transceiver operations for communication between the device and the remote device; and
        the device and the remote device are communicatively coupled via a wired Ethernet link.

2. The method of claim 1, wherein a remaining portion of each of the transmitted PMA training frames comprises exchanging parameters and control information.

3. The method of claim 2, wherein the remaining portion of the transmitted PMA training frames comprises fields for communicating a plurality of coefficients and associated index fields indicating which coefficients are currently being transmitted and which coefficients have already been received.

4. The method of claim 2, wherein the remaining portion of the transmitted PMA training frames comprises one or more of a current power backoff (PBO) field, a next PBO field, a requested PBO field, a transition count field, and at least one control field.

5. The method of claim 1, comprising receiving, by the device, PMA training frames from the remote device during the training period, wherein a majority portion of each of the received PMA training frames is comprised of pseudo random known sequences that are utilized to establish transceiver operations for communication between the device and the remote device.

6. The method of claim 5, wherein a remaining portion of the received PMA training frames comprises one or more of a current PBO field, a next PBO field, a requested PBO field, a transition count field, and at least one control field.

7. The method of claim 6, comprising determining a power level change based on one or more of the current PBO field, the next PBO field, and the requested PBO field.

8. The method of claim 6, wherein the transition count field indicates a number of received PMA training frames after which a power level change occurs in a signal of the remote device or a number of received PMA training frames after which a state transition occurs in the remote device.

9. The method of claim 6, wherein the received PMA training frames are communicated to the device by the remote device after the remote device recovers a master clock during the training period.

10. The method of claim 1, comprising programming coefficients in a precoder in the device during the training period.

11. A system for setting up communication devices, the system comprising:
a device that is operable to transmit physical medium attachment (PMA) training frames to a remote device during a training period, wherein a majority portion of each of the transmitted PMA training frames is comprised of pseudo random known sequences that are utilized to establish transceiver operations for communication between the device and the remote device; and
the device is operable to be communicatively coupled to the remote device via a wired Ethernet link.

12. The system of claim 11, wherein a remaining portion of each of the transmitted PMA training frames comprises exchanging parameters and control information.

13. The system of claim 12, wherein the remaining portion of the transmitted PMA training frames comprises fields for communicating a plurality of coefficients and associated index fields indicating which coefficients are currently being transmitted and which coefficients have already been received.

14. The system of claim 12, wherein the remaining portion of the transmitted PMA training frames comprises one or more of a current power backoff (PBO) field, a next PBO field, a requested PBO field, a transition count field, and at least one control field.

15. The system of claim 11, wherein:
the device is operable to receive PMA training frames from the remote device during the training period; and
a majority portion of each of the received PMA training frames is comprised of pseudo random known sequences that are utilized to establish transceiver operations for communication between the device and the remote device.

16. The system of claim 15, wherein a remaining portion of the received PMA training frames comprises one or more of a current PBO field, a next PBO field, a requested PBO field, a transition count field, and at least one control field.

17. The system of claim 16, wherein the device is operable to determine a power level change based on one or more of the current PBO field, the next PBO field, and the requested PBO field.

18. The system of claim 16, wherein the transition count field indicates a number of received PMA training frames after which a power level change occurs in a signal of the remote device or a number of received PMA training frames after which a state transition occurs in the remote device.

19. The system of claim 16, wherein the received PMA training frames are communicated to the device by the remote device after the remote device recovers a master clock during the training period.

20. The system of claim 11, wherein the device comprises a precoder and is operable to program coefficients in the precorder during the training period.

* * * * *